United States Patent [19]

Rossman, deceased

[11] 3,709,712
[45] Jan. 9, 1973

[54] PROCESS OF SEALING LEAKS
[75] Inventor: Joseph Rossman, deceased, late of Philadelphia, Pa. by Provident National Bank, executor
[73] Assignee: Joseph J. Packo, Fort Lauderdale, Fla.
[22] Filed: Jan. 6, 1971
[21] Appl. No.: 104,458

[52] U.S. Cl. ..................117/2 R, 117/62, 117/94, 106/33, 138/97, 138/99, 264/36
[51] Int. Cl. ............................B23p 7/04, B23p 7/00
[58] Field of Search ..........117/2 R, 37 R, 62, 95, 94; 138/97, 99; 106/33; 264/36

[56] References Cited

UNITED STATES PATENTS 3,578,479  5/1971  Packo ..................................117/2 R
3,507,725  4/1970  Hylak ..................................138/97
3,141,478  7/1964  Copeland ............................138/99

Primary Examiner—Alfred L. Leavitt
Assistant Examiner—M. F. Esposito
Attorney—Hugo E. Weisberger

[57] ABSTRACT

Leaks in pipelines, conduits, tanks, vessels and the like are sealed by introducing ammonia gas under pressure into such equipment which will escape through any existing leaks and react with an aqueous metal salt solution supplied at the external site of the leak to form a solid reaction product which seals the leak. Ammonia gas admixed with carbon dioxide gas may also be used in this process to produce complex solid reaction products for sealing leaks.

7 Claims, No Drawings

PROCESS OF SEALING LEAKS

SUMMARY OF THE INVENTION

Leaks in pipelines, conduits, tanks, vessels and the like which are adapted to retain fluids are sealed by introducing ammonia gas under pressure at usual prevailing temperatures into such equipment which will escape through any existing leaks and react with an aqueous metal salt solution of suitable concentration applied or supplied at the external locus of the leak. The ammonia reacts with the metal salt solution at the situs of the leak to form a water-insoluble solid reaction product which seals the leak. A large number of aqueous metal salt solutions can be used, such as aqueous metal solutions of iron, zinc, magnesium, lead, aluminum, bismuth, chromium, cadmium, copper, tin, antimony, nickel, cobalt, manganese, calcium, barium, strontium, and mercury. The ammonia reacts with such metal salt solutions to form water-insoluble solid reaction products which will seal the leak. In the case where a pipeline is buried underground in soil or sand a solution of a suitable metal salt can be introduced by a hollow lance inserted in the soil adjacent the situs of the leak. Also the soil adjacent the area of a leak may be saturated with an aqueous solution of a suitable metal salt. The ammonia escaping from an existing leak will react with the metal salt to form a solid water-insoluble reaction product which will seal the leak as well as bond the soil adjacent the leak and serve to provide a reinforcing matrix adjacent the situs of the leak.

The metal salts may be used in any suitable concentration depending upon their solubility in water and the size of the leaks to be sealed can be readily determined for each case.

The metal salt solutions may also be supplied at the locus of a leak by applying a slurry of clays, soil, porous or absorbent comminuted materials such as paper pulp, fibrous materials, absorbent porous materials, diatomaceous earth or other suitable vehicle or carrier which will retain a solution of the metal salt which will react with the escaping ammonia. The solid water-insoluble reaction products will seal the leaks present as well as bond the carrier to form a reinforcing matrix at the locus of the leaks. Such procedure is particularly effective to seal leaks in conduits, tanks and other equipment which have exposed or readily accessible external surfaces.

A large number of aqueous metal salt solutions of the elements previously listed, singly or in admixture, can be used, for example ferric chloride; ferric sulfate; ferric nitrate; nickel sulfate, chloride or nitrate; magnesium chloride, nitrate or sulfate; aluminum sulfate; alum; manganous or manganic sulfate; zinc sulfate, chloride or nitrate; stannous or stannic chloride, etc. The reaction of ammonia and the metal salts in aqueous solution produces solid water-insoluble reaction products. The volatile organic amines, such as methylamine, dimethylamine, trimethylamine and ethylamine, may be used in place of ammonia to react with metal salt solutions for forming solid water-insoluble reaction products that can seal leaks as described previously.

Gaseous ammonia $NH_3$ is readily soluble in water (1148 vols. in 1 vol. water at 0° C at 760 mm.) and forms ammonium hydroxide. A very small portion of the dissolved $NH_3$ reacts with water according to the equation:

$$NH_3 + H_2O \rightleftharpoons NH_4^+ + OH^-$$

The following reactions of ammonia and metal salts are illustrative examples in forming solid water-insoluble reaction products for sealing leaks by procedures previously described:

$$Bi^{+++} + 3OH^- \rightleftharpoons Bi(OH_3)_3$$

$$Cd^{++} + 2OH^+ \rightleftharpoons Cd(OH)_2$$

$$Sn^{++} + 2OH^- \rightleftharpoons SN(OH)_2$$

$$SN^{++++} + 4OH^- \rightleftharpoons Sn(OH)_4$$

$$Al^{+++} + 3NH_3 + 3H_2O \rightleftharpoons Al(OH)_3 + 3NH_4^+$$

$$Cr^{+++} + 3OH^- \rightleftharpoons Cr(OH)_3$$

$$Fe^{++} + 2OH^- \rightleftharpoons Fe(OH)_2$$

$$Fe^{+++} + 3OH^- \rightleftharpoons Fe(OH)_3$$

$$Mn^{++} + 2OH^- \rightleftharpoons Mn(OH)_2$$

$$Zn^{++} + 2OH^- \rightleftharpoons Zn(OH)_2$$

When volatile amines are used, as previously indicated, they will react with water according to the equation:

$$RNH_2 + H_2O \rightleftharpoons RNH_3^+ + OH^-$$

The $OH^-$ ions so produced will react with the metal ions to produce solid reaction products similar to those produced with ammonia as explained above.

In certain of the reactions using salts of copper, nickel, zinc, cobalt, cadmium, antimony and chromium, excess ammonia may solubilize the initial solid reaction product. Therefore, when using such metal salts the use of excess ammonia should be avoided. In order to assure the production of insoluble reaction products when ammonia-soluble solid reaction products are produced, I may introduce suitable amounts of carbon dioxide gas in the equipment after the ammonia gas has been first introduced. Carbon dioxide gas at prevailing temperatures and pressures is fairly soluble in water, which at 15° C dissolves its own volume of gas. A portion of the added carbon dioxide gas will dissolve in the water of the metal salt solution present at the situs of the leak and combines with the water to form carbonic acid as follows:

$$H_2O + CO_2 \rightleftharpoons H_2CO_3$$

The carbonic acid reacts with the divalent or trivalent metal hydroxides which have been produced by the reaction of ammonia and the metal salt solution to form corresponding insoluble metal carbonates as follows:

$$H_2CO_3 + \overset{++}{M}(OH)_2 = \overset{++}{M}(CO_3) + 2H_2O$$

$$3H_2CO_3 + 2\overset{+++}{M'}(OH)_3 = \overset{+++}{M_2'}(CO_3)_3 + 6H_2O$$

The resulting solid reaction products which seal the leak may be various mixtures of metal carbonates and hydroxides depending upon the concentration and the specific metal salt solutions used and the amounts of ammonia gas and carbon dioxide introduced as previously described.

My process of sealing leaks thus can be carried out by using ammonia gas alone which reacts with an aqueous metal salt solution supplied externally at the situs of the leak to form a solid water-insoluble reaction product which seals the leak. The respective chloride, sulfate and nitrate salts of the metals previously referred to are water-soluble and are advantageous to use in my process. The ammonia-reaction products of these salts are generally complex metal hydroxides which seal leaks, and furthermore may dehydrate or react with any oxygen that may be present to form complex metal oxides of unknown constitution. When small amounts of carbon dioxide gas are introduced, as described previously, a portion or all of the metal hydroxide present may be converted to complex metal carbonates mixed with the metal hydroxides present which also produces effective solids for sealing leaks.

EMBODIMENTS OF THE INVENTION

In carrying out the present sealing method, the locus of the leak in the pipeline, tank or other closed equipment is determined by any one of the known procedures as described for example in Packo Pat. 3,483,735, Dec. 16, 1969. In the case of a pipeline or conduit buried in the soil an aqueous solution of a suitable metal salt or mixtures of metal salts previously described of suitable concentration is introduced at the locus of the leak, either by wetting or saturating the soil adjacent the leak with the metal salt solution in any suitable manner, such as by spraying the region of the soil above the situs of the leak with the metal salt solution in sufficient amount to soak the soil down to the situs adjacent the leak, or by injecting the solution into the soil adjacent the situs of the leak through a hollow lance or pipe through which the salt solution is fed or pumped under pressure if necessary to soak or saturate the soil adjacent the leak.

Ammonia gas under sufficient pressure, for example ½ to 5 lbs. pressure, is then introduced into the closed pipeline so that it will escape from the existing leak. The ammonia will then react with the aqueous metal solution present to form a solid reaction product which will seal the leak. As explained previously, volatile organic amines may be used in place of ammonia gas or mixtures of ammonia and amines may be used. Also ammonia gas may be first used and followed by carbon dioxide gas to form water-insoluble reaction products which seal the leaks. In the case of pipelines or other equipment buried in soil, sand and the like, the metal reaction products formed at the site of the leak will also bond the particulate components of the soil and the like to form a reinforcing matrix at the situs of the leak and thus strengthen the seal.

EXAMPLE 1

A ½ inch diameter steel pipe, 2 feet long, is drilled with a 1/32 inch hole. One end of the pipe is sealed and the other end connected to a source of ammonia gas under pressure. The pipe is buried in sand which is soaked with a 20 percent water solution of ferric chloride adjacent the drilled hole. Ammonia gas is introduced into the pipe under ½ pound pressure at room temperature. The leak is sealed at the end of 3 hours.

The following reactions take place to produce insoluble ferric hydroxide which seals the leak:

$$NH_3 + H_2O = NH_4OH$$

$$3NH_4OH + FeCl_3 = Fe(OH)_3 + 3NH_4Cl$$

EXAMPLE 2

Example 1 is repeated except at the end of 2½ hours the pipe is connected to a source of carbon dioxide gas at ½ pound pressure for one-half hour and the leak is sealed. The solid reaction product contains insoluble ferric hydroxide produced by the reaction given in Example 1 as well as insoluble ferric carbonate productted by the following reactions:

$$CO_2 + H_2O = H_2CO_3$$

$$2Fe(OH)_3 + 3H_2CO_3 = Fe_2(CO_3)_3 + 6H_2O$$

EXAMPLE 3

Example 1 is repeated using trimethylamine gas which results in a seal at the end of 3 hours.

The concentrations of the metal salt aqueous solutions used for sealing leaks may vary from dilute solutions, for example 5 percent, up to saturation concentrations depending upon the specific salt or mixtures of salts used, the size and nature of the leak to be sealed, and the pressure of the reacting gas or gases introduced in the equipment.

Similar reactions of ammonia, volatile organic amines, and carbon dioxide with aqueous solutions of the metal salts previously disclosed may be used for stabilizing soils by saturating the soil with a suitable aqueous solution of a metal salt and then subjecting the treated soil to ammonia gas or by spraying a water solution of ammonia. Such method may be used for stabilizing the walls of pits, trenches, walls, dugouts, caverns, chambers, etc., formed in soil, earth, clay, sand and the like. The ammonia and metal salt solution react to provide a solid reaction product which bonds the particulate components of the soil and the like to reinforce and strengthen the exposed surfaces.

I claim:

1. The process of sealing leaks in a pipeline conduit, vessel and like equipment adapted to retain fluids therein which comprises the steps of
   a. locating the situs of a leak in said equipment;
   b. supplying an aqueous solution of at least one water-soluble metal salt generating in water solution a divalent or trivalent metal ion capable of combining with hydroxyl ions to form water-insoluble products adjacent the external situs of said leak, said aqueous metal salt solution having a concentration from about 5 percent by weight up to saturation and being reactive with ammonia or an alkylamine to form a solid water-insoluble reaction product; and
   c. introducing into said equipment a gas selected from the group consisting of ammonia and a volatilized alkylamine under sufficient pressure to cause its escape from said leak and for a sufficient period of time for the ammonia or alkylamine to react with the aqueous solution of said metal salt present at the situs of the leak to form at the situs a solid water-insoluble reaction product which seals said leak.

2. The process of claim 1 wherein the aqueous solution of the metal salt is retained at the external locus of the leak in an absorbent porous solid inert vehicle.

3. The process of claim 1 wherein the equipment is buried in the ground and the ground is soaked at the locus of a leak with said aqueous metal salt solution.

4. The process of claim 1 wherein the gas is ammonia gas.

5. The process of claim 1 wherein the water-soluble metal salt is selected from the group consisting of the respective chloride, sulfate and nitrate salts of iron, copper, nickel, cobalt, lead, cadmium, manganese, zinc, tin, bismuth, mercury, magnesium, aluminum, antimony, calcium, strontium, barium, and chromium.

6. The process of claim 1 wherein ammonia gas is first introduced into the equipment and then carbon dioxide gas is introduced.

7. The process of claim 1 wherein a volatile alkyl amine is introduced into the equipment.

* * * * *